United States Patent
Eoff et al.

(10) Patent No.: US 8,273,692 B2
(45) Date of Patent: Sep. 25, 2012

(54) PERMEABILITY-MODIFYING DRILLING FLUIDS AND METHODS OF USE

(75) Inventors: Larry S. Eoff, Duncan, OK (US); Eldon D. Dalrymple, Duncan, OK (US); B. Raghava Reddy, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 13/206,848

(22) Filed: Aug. 10, 2011

(65) Prior Publication Data

US 2011/0294704 A1 Dec. 1, 2011

Related U.S. Application Data

(60) Division of application No. 10/806,894, filed on Mar. 23, 2004, now Pat. No. 8,008,235, which is a continuation-in-part of application No. 10/760,443, filed on Jan. 20, 2004, now Pat. No. 7,759,292.

(51) Int. Cl.
    *C09K 8/58* (2006.01)
(52) U.S. Cl. ........ 507/219; 507/230; 507/266; 507/267; 507/276; 166/305.1
(58) Field of Classification Search .................. None
    See application file for complete search history.

(56) References Cited

U.S. PATENT DOCUMENTS 4,152,274 A * 5/1979 Phillips et al. ................ 507/222
4,625,802 A * 12/1986 Sydansk ....................... 166/292
6,476,169 B1 * 11/2002 Eoff et al. .................. 526/307.2

FOREIGN PATENT DOCUMENTS

EP          1193365 A1 *  4/2002

* cited by examiner

*Primary Examiner* — John J Figueroa
(74) *Attorney, Agent, or Firm* — Robert A. Kent; McDermott Will & Emery LLP

(57) ABSTRACT

Methods of reducing the permeability of a subterranean formation to aqueous-based fluids using a water-soluble relative permeability modifier that comprises a hydrophobically modified polymer, wherein the hydrophobically modified polymer is a reaction product of: a hydrophilic polymer that comprises a polymer selected from the group consisting of a polyvinylamine, a poly(vinylamine/vinyl alcohol), and an alkyl acrylate polymer; and, a hydrophobic compound comprising at least one alkyl chain having a carbon chain length between about 4 and about 22 carbons. The water-soluble relative permeability modifier may be placed within a subterranean drilling operation such that the water-soluble relative permeability modifier attaches onto surfaces within the subterranean formation to effect permeability of aqueous fluids.

11 Claims, No Drawings

PERMEABILITY-MODIFYING DRILLING FLUIDS AND METHODS OF USE

CROSS-REFERENCE TO RELATED APPLICATIONS

This application is a divisional of U.S. patent application Ser. No. 10/806,894 filed on Mar. 23, 2004, entitled "Permeability-modifying drilling fluids and methods of use," by Larry S. Eoff, et al., which was itself a continuation-in-part of U.S. patent application Ser. No. 10/760,443 entitled Methods and Compositions for Reducing the Production of Water and Stimulating Hydrocarbon Production from a Subterranean Formation, filed on Jan. 20, 2004, the entire disclosure of which is hereby incorporated by reference.

BACKGROUND OF THE INVENTION

The present invention relates to subterranean drilling operations, and more particularly, the present invention relates to methods and compositions for reducing the permeability of a subterranean formation to aqueous-based fluids during the drilling phase.

The process of drilling a well bore in a subterranean formation typically requires the use of a drilling fluid. During the drilling process, the drilling fluid is passed down through the inside of the drill string, exits through the drill bit, and returns to the surface through the annulus between the drill string and the well bore. Among other things, the circulating drilling fluid lubricates the drill bit, carries drill cuttings to the surface, and balances the formation pressure exerted on the well bore. This process in the life of a well is known as the "drilling phase." It is understood that there is also a "production phase" in the life of a well, during which hydrocarbons or other desired substances may be produced.

While well bores usually are drilled in hydrocarbon-producing formations, the formations may contain layers of water or may be located adjacent to water-producing zones. The high mobility of water may allow it to flow into the well bore by way of natural fractures and/or high permeability streaks present in the formation. Over the life of such wells, the ratio of water to hydrocarbons recovered often becomes so high that the cost of producing the water, separating it from the hydrocarbons, and disposing of this water may represent a significant economic loss. Besides being highly undesirable during the production phase, water-producing zones may cause problems in the well bore with certain completions activities. However, these problems with the production of undesired water generally are not addressed during the drilling phase.

To reduce the production of undesired water from hydrocarbon-producing formations, aqueous polymer solutions that may contain cross-linking agents have been used. Such polymer solutions are injected into the formation and cross-linked to form stiff gels that may stop or reduce the flow of the undesired water. Even when a polymer solution is properly placed in a water-producing section, however, the cross-linked gels formed may not remain stable in the zone due to thermal degradation and/or differences in the adsorption characteristics of the polymer, associated cross-linker, and the like. Further, the selected placement of a polymer solution in a producing formation may require expensive, time-consuming mechanical zonal isolation. Zonal isolation also may be inaccurate, which may lead to plugging and/or damaging the hydrocarbon-bearing sections. Damage to hydrocarbon producing pathways is undesirable.

Recently, wells in the production phase have been treated with compounds to reduce the production of water with hydrocarbons. These compounds are commonly referred to as "relative permeability modifiers." Relative permeability modifiers, such as polyacrylamide, may be dissolved in water and pumped into a subterranean formation that produces water and hydrocarbons, reducing the permeability of the formation to water without substantially affecting the permeability therein to hydrocarbons. The use of these relative permeability modifiers, however, has resulted in only small temporary reductions in water production and/or unacceptable levels of reduction in hydrocarbon production. Further, conventional relative permeability modifiers heretofore have not been used in the drilling phase.

SUMMARY OF THE INVENTION

The present invention relates to subterranean drilling operations, and more particularly, the present invention relates to methods and compositions for reducing the permeability of a subterranean formation to aqueous-based fluids during the drilling phase.

Some embodiments of the present invention provide a method of reducing the permeability of a subterranean formation to aqueous-based fluids during the drilling phase that comprises the steps of providing a water-soluble relative permeability modifier that comprises a hydrophobically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprise the steps of providing a water-soluble relative permeability modifier that comprises a hydrophilically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a water-soluble polymer without hydrophobic or hydrophilic modification; and placing the water-soluble relative permeability modifier into the subterranean formation during the drilling phase.

Some embodiments of the present invention provide a method of drilling a well bore in a subterranean formation that comprises the steps of providing a drilling fluid that comprises a base fluid, and a water-soluble relative permeability modifier that comprises a hydrophobically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble relative permeability modifier that comprises a hydrophilically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble polymer without hydrophobic or hydrophilic modification; and placing the drilling fluid in the well bore in the subterranean formation.

Another embodiment of the present invention provides a drilling fluid that comprises a base fluid, and a water-soluble relative permeability modifier that comprises a hydrophobically modified polymer.

Yet another embodiment of the present invention provides a drilling fluid that comprises a base fluid, and a water-soluble relative permeability modifier that comprises a hydrophilically modified polymer.

The features and advantages of the present invention will be readily apparent to those skilled in the art upon a reading of the description of the exemplary embodiments which follows.

DESCRIPTION OF EXEMPLARY EMBODIMENTS

The present invention relates to subterranean drilling operations, and more particularly, the present invention relates to methods and compositions for reducing the permeability of a subterranean formation to aqueous-based fluids during the drilling phase.

In certain embodiments of the present invention, the water-soluble relative permeability modifiers comprise hydrophobically modified polymers. As used herein, "water-soluble" refers to at least 0.01 weight percent soluble in distilled water. As used herein, "hydrophobically modified" refers to the incorporation into the hydrophilic polymer structure of hydrophobic groups, wherein the alkyl chain length is from about 4 to about 22 carbons. In another embodiment of the present invention, the water-soluble relative permeability modifiers comprise hydrophilically modified polymers. As used herein, "hydrophilically modified" refers to the incorporation into the hydrophilic polymer structure of hydrophilic groups. In yet another embodiment of the present invention, the water-soluble relative permeability modifiers comprise water-soluble polymers without hydrophobic or hydrophilic modification.

The hydrophobically modified polymers that may be used in the present invention typically have a molecular weight in the range of from about 100,000 to about 10,000,000. In an exemplary embodiment, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophobic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In certain exemplary embodiments of the present invention, the hydrophilic polymers comprise a polymer backbone that comprises polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain exemplary embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

In another embodiment of the present invention, the water-soluble relative permeability modifiers of the present invention comprise a hydrophilically modified polymer. The hydrophilically modified polymers used in the present invention typically have a molecular weight in the range of from about 100,000 to about 10,000,000. In an exemplary embodiment, the hydrophilically modified polymers comprise a polymer backbone that comprises polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymer may be a reaction product of a hydrophilic polymer and a hydrophilic compound. The hydrophilic polymers suitable for forming the hydrophilically modified polymers used in the present invention should be capable of reacting with hydrophilic compounds. In certain exemplary embodiments, suitable hydrophilic polymers include, homo-, co-, or terpolymers, such as, but not limited to, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers contain reactive amino groups in the polymer backbone or as pendant groups, which are capable of reacting with hydrophilic compounds. In an exemplary embodiment, the hydrophilic polymers comprise dialkyl amino pendant groups. In an exemplary embodiment, the hydrophilic polymers comprise a dimethyl amino pendant group and at least one monomer comprising dimethylaminoethyl methacrylate or dimethylaminopropyl methacrylamide. In another exemplary embodiment, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers comprising polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, and starches. In an exemplary embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers comprising halogen; sulfonates; sulfates; and organic acid derivatives. Examples of suitable polyethers include, but are not limited to, polyethylene oxides, polypropylene oxides, polybutylene oxides, and mixtures thereof. In an exemplary embodiment, the polyether comprises an epichlorohydrin terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate with epichlorohydrin terminated polyethyleneoxide methyl ether; the reaction product of polydimethylaminopropyl methacrylamide with epichlorohydrin terminated polyethyleneoxide methyl ether; and the reaction product of poly(acrylamide/dimethylaminopropyl methacrylamide) with epichlorohydrin terminated polyethyleneoxide methyl ether. In an exemplary embodiment, the hydrophilically modified polymer comprises the reaction product of a polydimethylaminoethyl methacrylate with epichlorohydrin terminated polyethyleneoxide methyl ether having a weight ratio of polydimethylaminoethyl methacrylate to epichlorohydrin terminated polyethyleneoxide methyl ether of 3:1.

In another embodiment of the present invention, the water-soluble relative permeability modifiers comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

In certain embodiments of the present invention, the water-soluble relative permeability modifiers of the present invention may be placed into a subterranean formation during the drilling phase. As filtrate from the drilling fluids leaks off into the subterranean formation, it is believed that the water-soluble relative permeability modifier, among other things, may attach to surfaces within the subterranean formation. The presence of the water-soluble relative permeability modifiers in the subterranean formation may reduce the permeability of the treated zones of the subterranean formation to aqueous-based fluids (e.g., water) without substantially changing the permeability to hydrocarbons. This may reduce the subsequent problems associated with water flowing into the well bore from the subterranean formation.

In one embodiment of the present invention, the water-soluble relative permeability modifiers of the present invention may be placed into the subterranean formation in a drilling fluid that comprises the water-soluble relative permeability modifiers. The drilling fluids of the present invention generally comprise a base fluid and a water-soluble relative permeability modifier of the present invention. Moreover, other additives suitable for use in drilling fluids optionally may be added to the drilling fluids of the present invention as desired.

The base fluid utilized in the drilling fluids of the present invention may comprise aqueous-based fluids, oil-based fluids, or mixtures thereof. Where the base fluid is aqueous-based, the water utilized can be fresh water, salt water (e.g., water containing one or more salts dissolved therein), brine (e.g., saturated salt water), or seawater. Generally, the water may be from any source provided that it does not contain an excess of compounds that may adversely affect other components in the drilling fluid. Where the base fluid is oil-based, examples of suitable oils include, but are not limited to, mineral oils, synthetic oils, esters and the like. Generally, any oil that can be emulsified is suitable for use as a base fluid in the drilling fluids of the present invention. It should be understood that where oil-based drilling fluids are used in the present invention, such oil-based drilling fluids may comprise an emulsified aqueous phase that allows the modified water-soluble polymer to be incorporated into the oil-based drilling fluids.

The water-soluble relative permeability modifier generally should be present in the drilling fluids in an amount sufficient to provide the desired degree of permeability modification. In an exemplary embodiment, the water-soluble relative permeability modifier is present in the drilling fluids of the present invention in an amount in the range of from about 0.02% to about 10% by weight of the drilling fluid. In an exemplary embodiment, the water-soluble relative permeability modifier is present in the drilling fluids of the present invention in an amount in the range of from about 0.05% to about 1.0% by weight of the drilling fluid.

Additional additives may be added to the drilling fluids of the present invention as deemed appropriate by one skilled in the art for improving the performance of the drilling fluids with respect to one or more properties. Examples of such additives include, but are not limited to, emulsifiers, viscosifiers, fluid loss additives, salts, shale swelling inhibitors, weighting agents, and numerous other additives suitable for use in drilling operations.

While a number of exemplary embodiments described herein relate to drilling fluids, it is to be understood that the relative permeability modifiers of the present invention may be placed into the subterranean formation as part of other well bore fluids, used in the drilling phase, such as drill-in fluids and completion fluids.

Some embodiments of the present invention provide a method of reducing the permeability of a subterranean formation to aqueous-based fluids during the drilling phase that comprises the steps of providing a water-soluble relative permeability modifier that comprises a hydrophobically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a hydrophilically modified polymer; and placing the water-soluble relative permeability modifier into the subterranean formation during the drilling phase.

Another embodiment of the present invention provides a method of reducing the permeability of a subterranean formation to aqueous-based fluids during the drilling phase that comprises the steps of providing a water-soluble relative permeability modifier that comprises a water-soluble polymer without hydrophobic or hydrophilic modification; and placing the water-soluble relative permeability modifier into the subterranean formation during the drilling phase.

Some embodiments of the present invention provide a method of drilling a well bore in a subterranean formation that comprises the steps of providing a drilling fluid that comprises a base fluid, and a water-soluble relative permeability modifier that comprises a hydrophobically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble relative permeability modifier that comprises a hydrophilically modified polymer; and placing the drilling fluid in the well bore in the subterranean formation.

Another embodiment of the present invention provides a method of drilling a well bore in a subterranean formation that comprises the steps of providing a drilling fluid that comprises a base fluid, and a water-soluble polymer without hydrophobic or hydrophilic modification; and placing the drilling fluid in the well bore in the subterranean formation.

Another embodiment of the present invention provides a drilling fluid that comprises a base fluid, and a water-soluble relative permeability modifier that comprises a hydrophobically modified polymer.

Yet another embodiment of the present invention provides a drilling fluid that comprises a base fluid, and a water-soluble relative permeability modifier that comprises a hydrophilically modified polymer.

To facilitate a better understanding of the present invention, the following examples of the preferred embodiments are given. In no way should the following examples be read to limit, or define, the scope of the invention.

Examples

Permeability reduction tests were performed using two treatment solutions and a multipressure tap Hassler sleeve containing a Berea sandstone core. These permeability reduction tests were performed at 175° F. Further, Test No. 1 was conducted using a brine containing 2% by weight potassium chloride, and Test No. 2 was conducted using a brine containing 7% potassium chloride. Two treatment solutions were prepared for this series of tests.

The treatment solution used in Test No. 1 comprised 5,000 ppm of a sample polymer and 500 ppm of "ARQUAD® DMCB 80" dissolved in 2% potassium chloride brine. "ARQUAD® DMCB 80" is a surfactant that is commercially available from Akzo Nobel Inc., Chicago, Ill. The sample polymer comprises a hydrophobically modified polymer that comprises a polymer backbone comprising polar heteroatoms formed from the reaction of a cationic starch and an organic acid derivative, such as octenyl acid or dodecenyl succinic acid.

The treatment solution used in Test No. 2 comprised 5,000 ppm of the sample polymer dissolved in 7% potassium chloride brine.

The following procedure was used for this series of tests, the results of which are provided in Table 1. For each test, the above-described brines were flowed through the Berea core, followed by oil (kerosene), followed by brine. This third brine flow was maintained until the pressure stabilized, yielding an initial brine permeability. Next, a treatment solution was flowed into the core. Next, the brine flow was reestablished until the pressure stabilized, yielding a final permeability from which the brine permeability was calculated using the formula [1−(final permeability/initial permeability)]×100. The multipressure tap Hassler sleeve allowed the core permeability to be divided into four segments. In the tests, the initial brine flow was from segment 1 to segment 4. The treatment solution flow was from segment 4 to segment 1, and the final brine flow was from segment 1 to segment 4. The results of the tests are provided below in Table 1.

TABLE 1

| Test | Sample Polymer Concentration (ppm) | Brine | Surfactant | Surfactant Concentration | Initial Water Permeability (milli Darcy) | Water Permeability Reduction |
|---|---|---|---|---|---|---|
| Test No. 1 | 5000 | 2% KCL | ARQUAD DMCB-80 | 500 ppm | 90 | 85% |
| Test No. 2 | 5000 | 7% KCL | None | None | 120 | 69% |

This example indicates, inter alia, that a water-soluble relative permeability modifier of the present invention may reduce the permeability of a subterranean formation to aqueous-based fluids.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of reducing the permeability of a subterranean formation to aqueous-based fluids during a drilling phase comprising the steps of:

providing a water-soluble relative permeability modifier that comprises a hydrophobically modified polymer, wherein the hydrophobically modified polymer is a reaction product of:
- a poly(vinylamine/vinyl alcohol) hydrophilic polymer, and
- a hydrophobic compound comprising at least one alkyl chain having a carbon chain length between about 4 and about 22 carbons; and placing the water-soluble relative permeability modifier into the subterranean formation during the drilling phase such that the water-soluble relative permeability modifier attaches onto a surface within the subterranean formation.

2. The method of claim 1 wherein the hydrophobically modified polymer has a molecular weight in the range of from about 100,000 to about 10,000,000.

3. The method of claim 1 wherein the hydrophobic compound is selected from the group consisting of an alkyl halide, a sulfonate, an organic acid derivative, and a combination thereof.

4. The method of claim 1 wherein the organic acid derivative is selected from the group consisting of an octenyl succinic acid; a dodecenyl succinic acid; an anhydride; an ester; an amide of octenyl succinic acid; an amide of dodecenyl succinic acid; and combinations thereof.

5. The method of claim 1 wherein the water-soluble relative permeability modifier is placed into the subterranean formation in a drilling fluid.

6. The method of claim 5 wherein the water-soluble relative permeability modifier is present in the drilling fluid in an amount in the range of from about 0.02% to about 3% by weight of the drilling fluid.

7. A method of drilling a wellbore in a subterranean formation comprising the steps of:
providing a drilling fluid that comprises a base fluid and a water-soluble relative permeability modifier that comprises a hydrophobically modified polymer, wherein the hydrophobically modified polymer is a reaction product of:
- a poly(vinylamine/vinyl alcohol) hydrophilic polymer, and
- a hydrophobic compound comprising at least one alkyl chain having a carbon chain length between about 4 and about 22 carbons; and placing the drilling fluid into the subterranean formation during the drilling phase such that the water-soluble relative permeability modifier attaches onto a surface within the subterranean formation.

8. The method of claim 7 wherein the hydrophobically modified polymer has a molecular weight in the range of from about 100,000 to about 10,000,000.

9. The method of claim 7 wherein the hydrophobic compound is selected from the group consisting of an alkyl halide, a sulfonate, an organic acid derivative, and a combination thereof.

10. The method of claim 7 wherein the organic acid derivative is selected from the group consisting of an octenyl succinic acid; a dodecenyl succinic acid; an anhydride; an ester; an amide of octenyl succinic acid; an amide of dodecenyl succinic acid; and a combination thereof.

11. The method of claim 7 wherein the water-soluble relative permeability modifier is present in the drilling fluid in an amount in the range of from about 0.02% to about 3% by weight of the drilling fluid.

* * * * *